US006377981B1

(12) United States Patent
Ollikainen et al.

(10) Patent No.: US 6,377,981 B1
(45) Date of Patent: Apr. 23, 2002

(54) MODULAR DIGITAL DATA COMMUNICATION CYBERSTATION AND CYBERSERVER

(75) Inventors: Ari Ollikainen, Palo Alto; Terrence E. F. Kero, Pacifica, both of CA (US)

(73) Assignee: CyberStar, L.P., Palo Alto, CA (US)

( * ) Notice: Subject to any disclaimer, the term of this patent is extended or adjusted under 35 U.S.C. 154(b) by 0 days.

(21) Appl. No.: 08/975,749

(22) Filed: Nov. 20, 1997

(51) Int. Cl.[7] .............................................. G06F 13/14
(52) U.S. Cl. ...................... 709/217; 709/223; 709/226; 709/239; 455/3.2; 455/5.1; 455/12.1; 455/557; 455/428; 455/408; 725/67.68; 725/91; 725/92; 725/114.15; 725/64
(58) Field of Search ................................. 709/200, 226, 709/223, 217, 239, 233; 455/428, 408, 5.1, 466, 557, 3.2, 12.1, 6.1; 710/127; 375/222

(56) References Cited

U.S. PATENT DOCUMENTS

| | | | | |
|---|---|---|---|---|
| 5,727,065 A | * | 3/1998 | Dillion | 380/231 |
| 5,812,930 A | * | 9/1998 | Zavrel | 455/5.1 |
| 5,839,068 A | * | 11/1998 | Simmon | 455/427 |
| 5,852,721 A | * | 12/1998 | Dillon et al. | 709/217 |
| 5,909,559 A | * | 6/1999 | So | 710/127 |
| 5,937,331 A | * | 8/1999 | Kalluri et al. | 455/6.1 |
| 5,991,596 A | * | 11/1999 | Cunningham et al. | 455/12.1 |

* cited by examiner

Primary Examiner—Dung C. Dinh
Assistant Examiner—Hieu C. Le
(74) Attorney, Agent, or Firm—Kenneth W. Float

(57) ABSTRACT

A broadcast and interactive data distribution system that distributes broadcast and interactive data transmitted by way of a geostationary satellite, and optionally by way of a cable system, to personal computers. The system comprises a modular digital data communication cyberstation that is a modular computer and server that is external to the personal computers to which data is to be distributed. The cyberstation receives, optionally stores, and distributes the broadcast and interactive data to the personal computers. The cyberstation has wireless and optional wired interfaces for communicating with the personal computers. An optional cable modem may be used to directly communicate with the cable system. A satellite receiver is employed to communicate with the geostationary satellite, and a low-earth-orbit satellite transceiver is employed to communicate with low-earth-orbit satellites used to support information requests, data billing and status/diagnostic reporting to a service provider. An optional cable modem may be used to receive data by way of the cable system. An optional pass-through television interface may be used to display the broadcast data on a television receiver. The data distribution system and cyberstation thus provide for high-speed Internet access and web content and large file download delivery to personal computers of consumers and businesses by way of satellite and other systems.

16 Claims, 1 Drawing Sheet

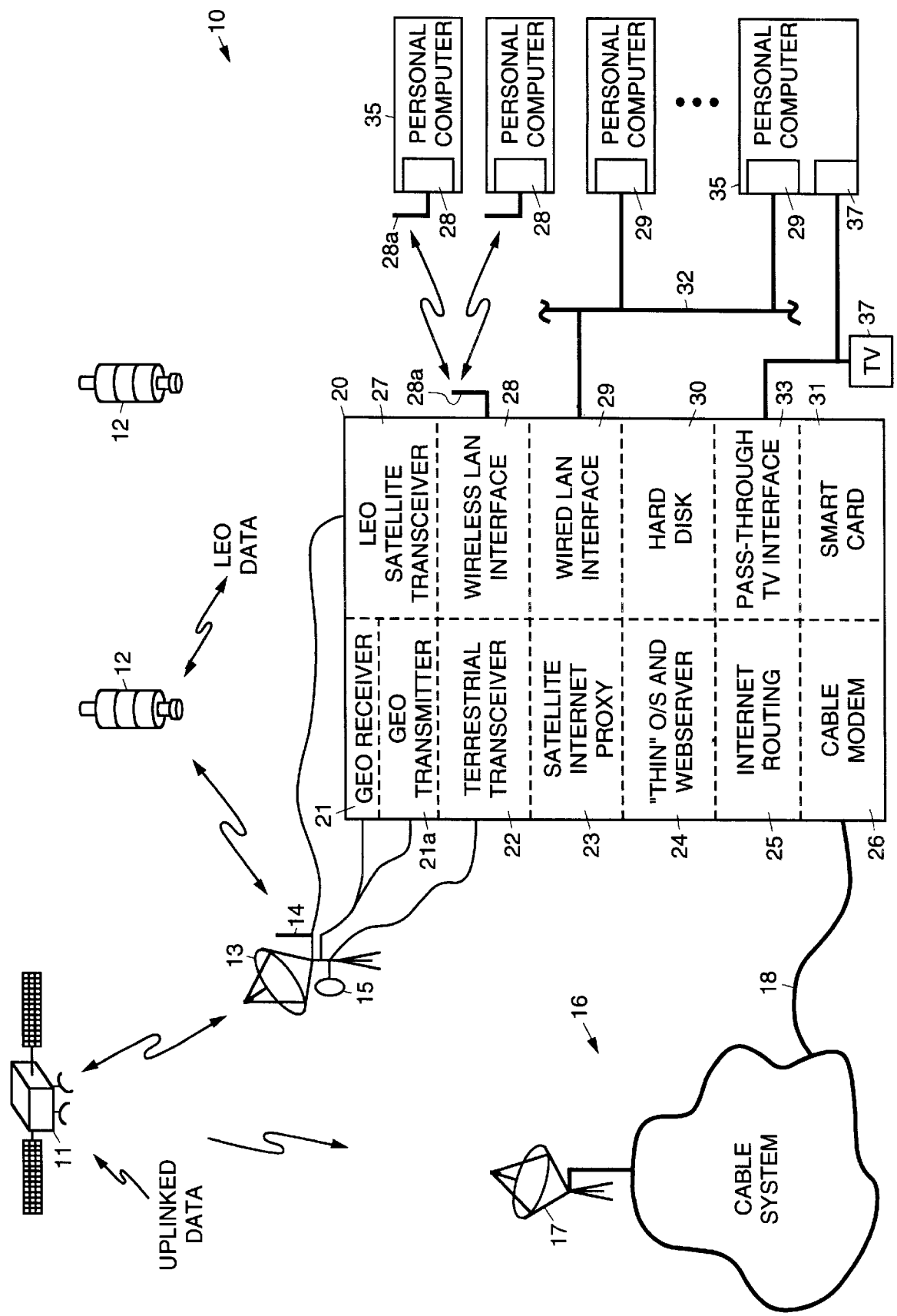

MODULAR DIGITAL DATA COMMUNICATION CYBERSTATION AND CYBERSERVER

BACKGROUND

The present invention relates generally to broadcast and interactive data distribution systems, and more particularly, to a broadcast and interactive data distribution system for distributing broadcast and interactive data services to personal computers using a modular computer/server that is external to the personal computers.

The majority of conventional systems that deliver broadcast and interactive data to personal computers have used modem that are directly connected to the personal computers. A modems interconnects a personal computer by way of telephone lines to another computer such as one provided by an Internet service provider, for example, that is connected to the Internet, and over which broadcast and interactive data is sent to the personal computer. In order for the personal computer to receive data, it and the modem must be turned on.

Another data distribution system uses a conventional modem directly connected to a personal computer to transmit requests for data over the Internet and the requested data is returned by way of a satellite link that transmits the data to a processing card installed in the personal computer. This system transmits the requested data at relatively high speed (400 MHz data transfer rate), which is on the order of from ten to twenty times the speed of typical modems. As with the conventional modem-based system, in order for the personal computer to receive data, it and the modem must me turned on.

Accordingly, it is an objective of the present invention to provide for an improved data distribution system that distributes broadcast and interactive data services to personal computers and that overcomes limitations of prior art systems.

SUMMARY OF THE INVENTION

To accomplish the above and other objectives, the present invention is a broadcast and interactive data distribution system that comprises a modular digital data communication cyberstation for distributing broadcast and interactive data services to personal computers. The cyberstation provides for a flexible interface between satellite/wireless broadcast/two-way interactive data services and personal computers that may be configured to suit a variety of different communications alternatives and deployment situations. An enhanced version of the cyberstation is known a cyberserver which includes additional memory and data storage capability.

In contrast to conventional systems, the cyberstation is a modular standalone data receiving and sending computer and server that is external to the personal computers to which data is to be distributed. The cyberstation of the data distribution system receives, optionally stores, and distributes the broadcast and interactive data to the personal computers. The cyberstation thus receives broadcast data transmissions and forwards or stores them on behalf of the personal computers. The cyberstation is preferably used to wirelessly interconnect personal computers to satellite networks. The cyberstation thus acts as an interface to satellite/wireless data networks on behalf of client personal computers.

The cyberstation includes subsystems for receiving and storing broadcast data continuously (24 hours per day, 7 days per week) without requiring the personal computers that are to ultimately receive the data to be turned on. Furthermore, the cyberstation includes subsystems that permit it to communicate with the personal computers using wireless or optional wired connections.

The cyberstation is configured in a set-top-box form factor and supports a variety of high-speed interfaces, including geosynchronous satellite receiver and transmitter interfaces, a wireless local area network (LAN) interface, and a low earth orbit low-bandwidth satellite transceiver interface (modem). The modular digital data communication cyberstation may also include a cable modem, a pass-through television interface, a wired local area network interface, a wireless terrestrial data service transceiver, and a smart card circuit.

The cyberstation thus provides high-speed Internet access and web content and large file download delivery to personal computers of consumers and businesses by way of satellite and other wireless systems. The cyberstation preferably delivers these services in the form of a reliable, always-on, wireless digital interface to the personal computers. The cyberstation thus provides a means for implementing a variety of customized stand-alone receiver-transmitter stations that can provide service to multiple household or business personal computers using wireless or optional wire local area networks as a local communication system.

BRIEF DESCRIPTION OF THE DRAWINGS

The various features and advantages of the present invention may be more readily understood with reference to the following detailed description taken in conjunction with the accompanying drawing FIGURE which illustrates a broadcast and interactive data distribution system employing a modular digital data communication cyberstation in accordance with the principles of the present invention.

DETAILED DESCRIPTION

Referring to the sole drawing FIGURE, it illustrates the architecture of a broadcast and interactive data distribution system 10 employing a modular digital data communication cyberstation 20 in accordance with the principles of the present invention. The broadcast and interactive data distribution system 10 comprises a geostationary earth orbiting (GEO) satellite 11, and a constellation of low earth orbit (LEO) satellites 12, and optionally includes a cable system 16. The geostationary earth orbiting satellite 11 orbits the earth at 22,300 nautical miles in synchronous orbit. The constellation of low earth orbit satellites 12 orbit the earth at about 600 nautical miles in synchronous orbit. The constellation of low earth orbit satellites 12 may be those of the Globalstar system developed by the assignee of the present invention. The optional cable system 16 has an antenna 17 for receiving broadcast data transmitted by way of the geostationary earth orbiting satellite 11 and cabling 18 that interconnects the cable system 16 to residences and businesses that it serves.

The cyberstation 20 employs several antennas for communication purposes. A first antenna 13 for communicating with the geostationary earth orbiting satellite 11. The first antenna 13 is a small diameter dish antenna 15. A second antenna 14 is provided for communicating between the ground station 13 and one of the low earth orbit satellites 12. The second antenna 14 is a small whip antenna attached to the first antenna 13. An optional third antenna 15 may be used to communicate with a wireless terrestrial data service. The respective antennas 13, 14, 15 are hardwired to various communication devices of the cyberstation 20, as will be described below. The respective antennas 13, 14, 15 provide wireless communications links between the cyberstation 20 and the geostationary earth orbiting satellite 11, the low earth orbit satellite 12, and the terrestrial data service.

The cyberstation 20 provides a digital interface that distributes broadcast and interactive data derived from the geostationary earth orbiting satellite 11, and optionally from the cable system 16 and the terrestrial data service, to personal computers 35 located in residences and businesses. The cyberstation 20 comprises a variety of subsystems and software that cooperate to distribute the broadcast and interactive data derived from service providers to the personal computers 35. Service providers uplink the broadcast and interactive data by way of the geostationary earth orbiting satellite 11, which data is downlinked to the first antenna 13. The downlinked data is then coupled by way of the hardwired connection to the cyberstation 20. Service providers may also uplink the broadcast and interactive data to the geostationary earth orbiting satellite 11 which data is downlinked to the cable system 16 by way of its antenna 17. The data downlinked to the cable system 16 is then retransmitted by way of the cabling 18 to the cyberstation 20.

The cyberstation 20 comprises a computer processor and software 24 that includes a geostationary (GEO) satellite receiver 21 for communicating by way of the geostationary earth orbiting satellite 11. The geostationary satellite receiver 21 receives broadcast and interactive data from the geostationary earth orbiting satellite 11 by way of the first antenna 13.

A "thin" (i.e., relatively small) operating system (O/S), such as may be provided by the commercially available QNX operating system, for example, and commercially available webserver software 24 are provided that are used to configure and operate the cyberstation 20 and to provide communication services to interface the cyberstation 20 to an Internet service provider. Satellite Internet proxy software 23 interfaces to the operating system and webserver software 24 and is used to control transmission of commands and reception of broadcast and interactive data from the service provider. Internet routing software 25 provides the services of a router to route incoming broadcast and interactive data to the appropriate personal computer 35.

An optional cable modem 26 is provided that is interconnected to the cabling 18 of the cable system 16 to provide a link between the cyberstation 20 and the cable system 16. A low earth orbit (LEO) low-bandwidth (100 bits/second) satellite transceiver 27 (modem) is provided that is used to communicate with the low earth orbit satellites 12 by way of the second antenna 14. The LEO transceiver 27 and antenna 14 may also be implemented using a very small aperture satellite (VSAT) transceiver 27, for example, in conjunction with a VSAT antenna to provide higher-speed two-way service. The LEO transceiver 27 and low earth orbit satellites 12 are part of a return path to the service provider that is used to transmit information requests, deliver feed-back, transmit billing data and perform status and diagnostic reporting. Alternatively, a geostationary satellite transmitter 21a may be employed to communicate with the service provider by way of the geostationary earth orbiting satellite 11. Furthermore, the terrestrial transceiver may be used in place of the LEO transceiver 27 and low earth orbit satellites 12 to provide the return path to the service provider, if it is desired.

The cyberstation 20 also comprises a low-cost wireless local area network (LAN) interface 28 having an antenna 28a, and may include an optional wired local area network interface 29. The wireless local area network interface 28 communicates over a wireless link (RF or infrared, for example) with personal computers 35 that include a similar wireless local area network interface 28 and antenna 28a. The optional wired local area network interface 29 communicates with personal computers 35 equipped with local area network interface cards 29 by way of a local area network 32, such as an Ethernet network, for example. The optional wired local area network interface 29 is intended for use in businesses having their own local area networks. Users of the personal computers 35 only need to operate a conventional browser to access the broadcast and interactive data in a manner normally used to access the Internet, E-mail, or on-line services. Thus, the present system 10 is basically transparent to users of the personal computers 35.

The cyberstation 20 comprises a hard disk 30 that is used to store incoming broadcast and interactive data when personal computers 35 to which the data is to be transmitted are not turned on. The cyberstation 20 can thus receive and store broadcast data continuously (24 hours per day, 7 days per week) without requiring the personal computers 35 that are to ultimately receive the data to be turned on.

A smart card 31, which is a credit card circuit used in pay-per-view systems, for example, may also be installed in the cyberstation 20. The smart card 31 may be used for billing purposes. A pass-through television (TV) interface 33 may also be installed in the cyberstation 20 which permits television signals to be distributed to a television receiver 37 or to a television receiver card 37 installed in the personal computers 35.

From the above, it can be seen that the cyberstation 20 provides for a flexible interface between satellite/wireless broadcast/two-way interactive data services distributed using geostationary earth orbiting satellites 11, low earth orbit satellites 12 and/or a cable system 16, and the personal computers 35. The cyberstation 20 may be configured to suit a number of different communications alternatives and deployment situations. An enhanced version of the cyberstation 20 known a cyberserver includes additional computer memory and hard disk 30 storage, but is functionally the same as the cyberstation 20 described above.

One key aspect of the cyberstation 20 is its modularity, in that it can be equipped with a plurality of interface options for satellite reception and transmission, and/or wireless data communication. The cyberstation 20 may be implemented in the form of a computer motherboard having plug-in daughter modules or cards that provide each of the different interfaces described above. Another key aspect of the cyberstation 20 is that is may be configured to provide a wireless interface between a service provider and personal computers 35. Another aspect of the cyberstation 20 is that it may operate at all times, distributing broadcast and interactive data to computers 35 when they are turned on, and storing the data for later distribution to the computers 35 when they are turned off.

Thus, the cyberstation 20 provides a means for implementing a variety of customized standalone receiver/transmitter stations that can provide service to multiple household or business personal computers 35 using wireless or optional wired local area networks 27, 28 as a local communication system. Unlike PC-based satellite receiver cards that must be mated with, draw power from, and be supported by software loaded into the host personal computer, the cyberstation 20 may be set up in a convenient location and left continuously powered up and connected to its antennas 13, 14. The cyberstation 20 provides continuous connectivity to satellite-based data delivery services with a full-time low-bandwidth LEO return path to support information requests, feedback delivery, data billing and status/diagnostic reporting. The terrestrial transceiver 22 and antenna 15 may be used to provide wireless terrestrial data service, where available, to support lower bandwidth Internet access, for example, as an adjunct to high-speed satellite data services.

Thus, an improved data distribution system employing a modular digital data communication that distributes broadcast and interactive data services to personal computers has been disclosed. It is to be understood that the described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A data distribution system for distributing broadcast and interactive data to a personal computer, said system comprising:
    a geostationary earth orbiting satellite for transmitting broadcast and interactive data derived from an Internet service provider;
    wireless communication means for transmitting information requests to the Internet service provider;
    a modular digital data communication cyberstation that is external to the personal computer to which data is to be distributed and that provides an interface between the satellite and the personal computer for receiving broadcast and interactive data transmitted by way of the satellite, comprising:
        operating system and webserver software for configuring and operating the cyberstation and providing communication services to interface the cyberstation to the Internet service provider;
        satellite Internet proxy software for interfacing to the operating system and webserver software and for controlling transmission of commands and reception of broadcast and interactive data;
        routing software for routing incoming broadcast and interactive data to the personal computer;
        a satellite receiver coupled to a first antenna and for receiving broadcast and interactive data by way of the geostationary earth orbiting satellite;
        a transceiver coupled to a second antenna for communicating by way of the wireless communication means with the Internet service provider;
        a local area network interface; and
        a storage device for storing incoming broadcast and interactive data when the personal computer to which the data is to be transmitted is not turned on;
    and wherein the personal computer comprises a local area network interface for communicating with the local area network interface of the cyberstation;
    and wherein the cyberstation distributes broadcast and interactive data received from the geostationary earth orbiting satellite to the personal computer.

2. The system of claim 1 wherein the wireless communication means comprises one or more low earth orbit satellites.

3. The system of claim 1 wherein the wireless communication means comprises a terrestrial transceiver for communicating with the service provider.

4. The system of claim 1 wherein the local area network interfaces of the cyberstation and the personal computer comprise wireless local area network interface and antenna.

5. The system of claim 1 wherein the local area network interfaces of the cyberstation and the personal computer comprise a wired local area network interface interconnected by way of a local area network.

6. The system of claim 5 wherein the local area network comprises an Ethernet network.

7. The system of claim 3 wherein the local area network interfaces of the cyberstation and the personal computer comprise:
    a wireless local area network interface and antenna; and
    a wired local area network interface interconnected by way of a local area network.

8. The system of claim 1 further comprising:
    a cable system having an antenna for receiving broadcast and interactive data from the geostationary earth orbiting satellite, and having cabling that interconnects the cable system to the cyberstation; and
    a cable modem disposed in the cyberstation that is interconnected to the cabling of the cable system to provide a link between the personal computers and the cable system.

9. The system of claim 1 wherein the cyberstation further comprises a pass-through television interface for distributing television signals to a television receiver for display.

10. The system of claim 1 wherein the cyberstation further comprises a smart card for billing a customer for services.

11. A data distribution system for distributing broadcast and interactive data to a personal computer, said system comprising:
    a geostationary earth orbiting satellite for transmitting broadcast and interactive data derived from an Internet service provider;
    a low earth orbit satellite for transmitting information requests to the Internet service provider;
    a modular digital data communication cyberstation that is external to the personal computer to which data is to be distributed and that provides an interface between the satellite and the personal computer for receiving broadcast and interactive data transmitted by way of the satellite, comprising:
        operating system and webserver software for configuring and operating the cyberstation and providing communication services to interface the cyberstation to the Internet service provider;
        satellite Internet proxy software for interfacing to the operating system and webserver software and for controlling transmission of commands and reception of broadcast and interactive data;
        routing software for routing incoming broadcast and interactive data to the personal computer;
        a satellite receiver coupled to a first antenna and for receiving broadcast and interactive data by way of the geostationary earth orbiting satellite;
        a low earth orbit transceiver coupled to a second antenna for communicating by way of the low earth orbit satellite with the Internet service provider;
        a wireless local area network interface; and
        a storage device for storing incoming broadcast and interactive data when the personal computer to which the data is to be transmitted is not turned on;
    and wherein the personal computer comprises a wireless local area network interface for communicating with the local area network interface of the cyberstation;
    and wherein the cyberstation distributes broadcast and interactive data received from the geostationary earth orbiting satellite to the personal computer.

12. The system of claim 11 wherein the cyberstation and the personal computer each further comprise a wired local area network interface interconnected by way of a local area network.

13. The system of claim 12 wherein the local area network comprises an Ethernet network.

14. The system of claim 11 further comprising:

a cable system having an antenna for receiving broadcast and interactive data from the geostationary earth orbiting satellite, and having cabling that interconnects the cable system to the cyberstation; and a cable modem disposed in the cyberstation that is interconnected to the cabling of the cable system to provide a link between the personal computers and the cable system.

15. The system of claim 11 wherein the cyberstation further comprises a pass-through television interface for distributing television signals to a television receiver for display.

16. The system of claim 12 wherein the cyberstation further comprises a smart card for billing a customer for services.

* * * * *